United States Patent Office 3,405,614
Patented Oct. 15, 1968

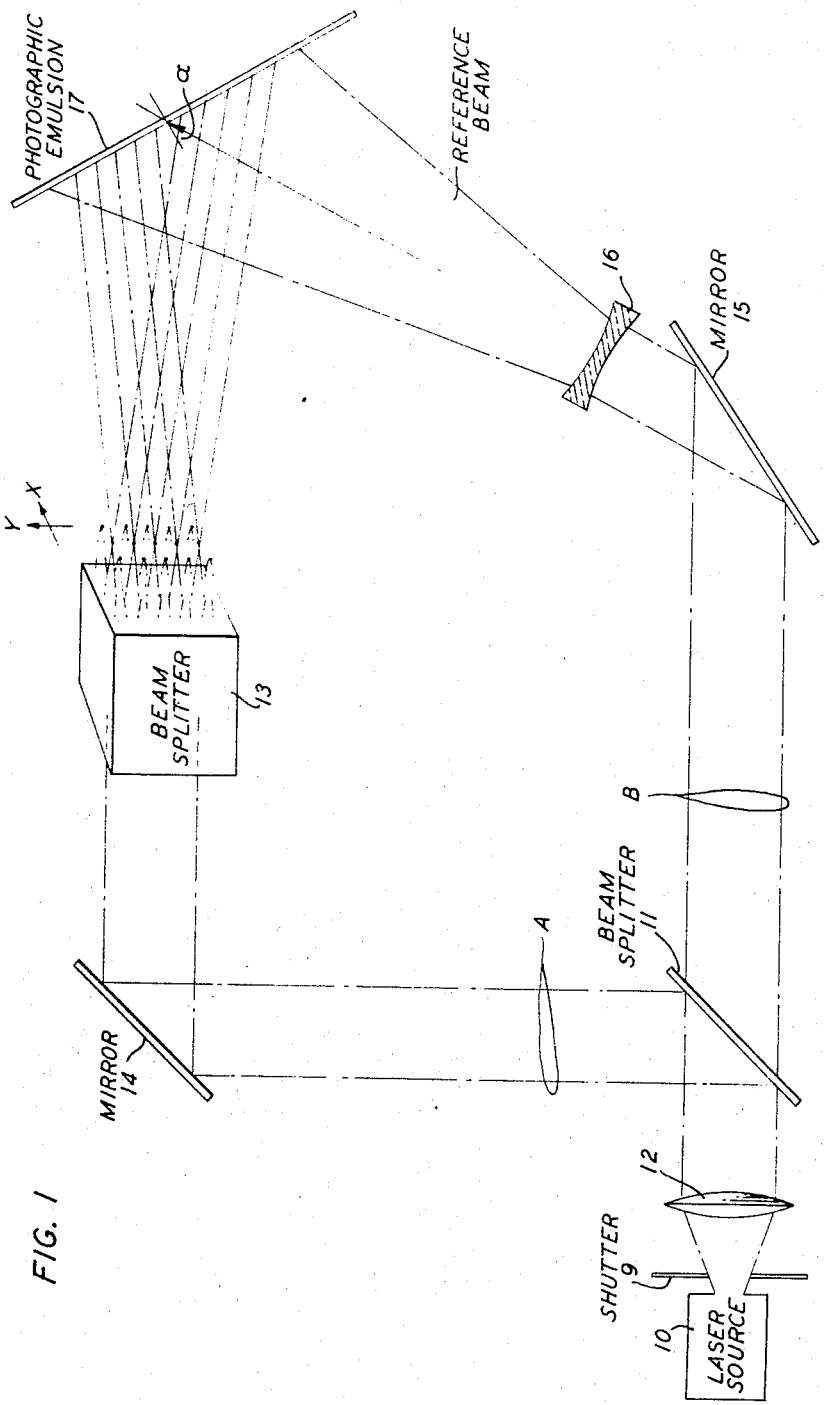

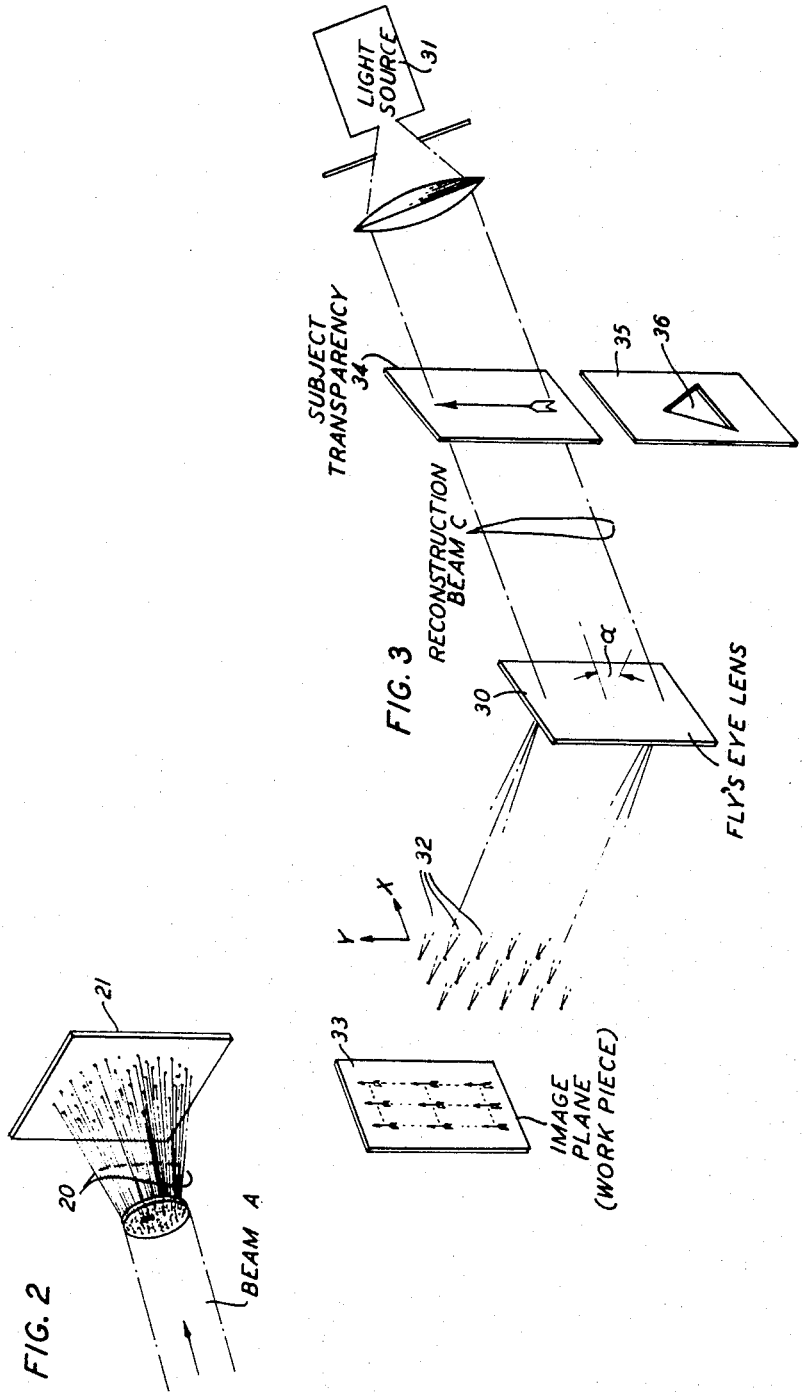

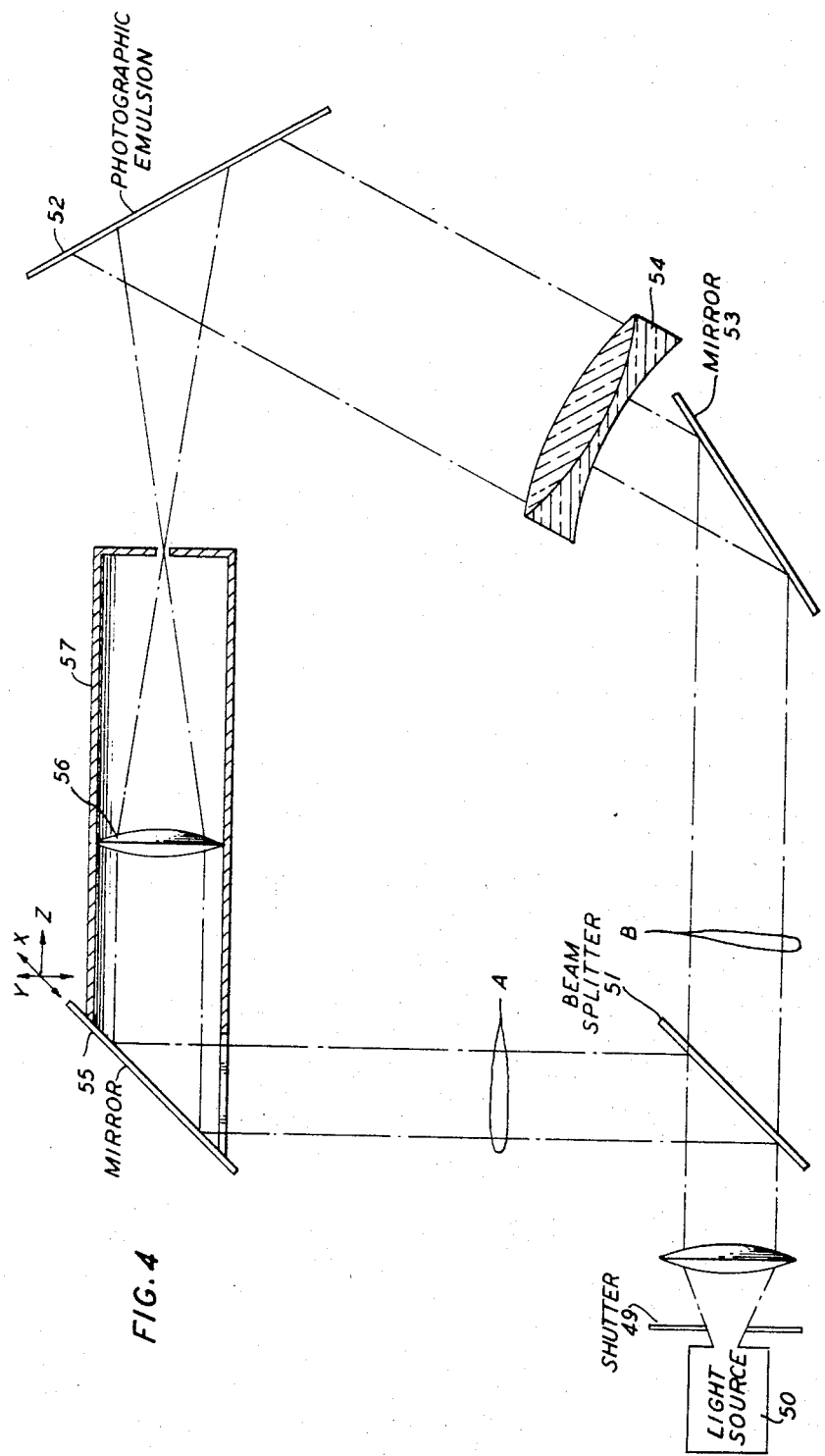

3,405,614
APPARATUS FOR PRODUCING A FLY'S EYE LENS
Lawrence H. Lin, Plainfield, and Erich O. Schulz-Du Bois, Oldwick, N.J., assignors to Bell Telephone Laboratories, Incorporated, New York, N.Y., a corporation of New York
Filed Dec. 1, 1965, Ser. No. 510,776
4 Claims. (Cl. 95—1)

This invention relates to apparatus and methods for fabricating fly's eye lenses.

The term "fly's eye lens" is a popular, and rather descriptive term for an optical component which produces a number of identical images from a single object. Such lenses can be used, for example, in the mass production of semi-conductor components where they would serve to expose a photoresist layer on the semiconductor slab in preparation for subsequent etching operations. Thus, a single exposure, using a single master mask, suffices to produce a large number of identical components, a typical number may be a hundred, arranged in a square, ten by ten array.

At present, fly's eye lenses comprise an array of spherical, plastic lenses, protruding from one side of a flat sheet of the same material, which provides the needed mechanical support. While satisfactory for many purposes, fly's eye lenses of this type cannot be made with wide angular apertures and, hence, can only resolve objects that are many times larger than the wavelength of light. There are, in addition, other limitations chaarcteristic of prior art fly's eye lenses which greatly limit their usefulness.

Improvements in fly's eye lenses are realized, in accordance with the present invention, by the utilization of holographic techniques.

The term "hologram" is used to describe a radically different photographic process. Ordinary photography consists of recording a three dimensional scene as a two dimensional image by focusing the light reflected from the objects in the scene onto a photographic plate by means of image-forming devices. The holographic process, which was invented less than 20 years ago, does not record an image of the object being photographed but, instead, records the reflected light waves themselves. As described in an article entitled "Photography by Laser," by E. N. Leith and J. Upatnieks, published in the June 1965 issue of Scientific American, pages 24–35, "The photographic record (of the reflected light waves), a hodgepodge of specks, blobs and whorls, is called a hologram; it bears no resemblance to the original object but nevertheless contains, in a kind of optical code, all the information about the object that would be contained in an ordinary photograph and much additional information that cannot be recorded by any other photographic process.

"The creation of an intelligible image from the hologram is known as the reconstruction process. In this stage the captured waves are in effect released from the hologram record, whereupon they proceed onward, oblivious to the time lapse in their history. The reconstructed waves are indistinguishable from the original waves and are capable of all the phenomena that characterize the original waves. For example, they can be passed through a lens and brought to a focus, thereby forming an image of the original object—even through the object has long since been removed! If the reconstructed waves are intercepted by the eye of an observer, the effect is exactly as if the original waves had been observed: the observer sees what to all appearances is the original object itself in full three-dimensional form, complete with parallax (the apparent displacement of an object when seen from different directions) and many other effects that occur in the normal 'seeing' process."

In accordance with the present invention, a fly's eye lens is made in the form of a hologram of an array of point sources. In a first illustrative embodiment of the invention, light from a monochromatic source is divided into a plurality of point sources. The light from all of these sources is simultaneously directed onto a photographic plate along with a reference beam of light derived from the common monochromatic source, to form an interference pattern, or hologram.

In a second embodiment of the invention, the hologram of the array of spots is formed one spot at a time, by successively changing the relative positions of the photographic plate and a single point source of light.

It is a feature of the invention that whereas the cost of the apparatus to produce the first fly's eye lens by holographic technique can be relatively high, depending upon the resolution required, additional lenses can be reproduced at small cost by ordinary contact print techniques or by simply exposing many holograms in succession.

These and other objects and advantages, the nature of the present invention, and its various features, will appear more fully upon consideration of the various illustrative embodiments now to be described in detail in connection with the accompanying drawings, in which:

FIG. 1 shows a first arrangement of apparatus for producing a fly's eye lens by means of holography;

FIG. 2 shows the use of optical fibers to produce an array of point sources;

FIG. 3 shows apparatus for producing a multiplicity of real images of a subject transparency from a fly's eye lens produced by holographic means; and FIG. 4 shows an arrangement of apparatus for producing a fly's eye lens by holographic means on a point-by-point basis.

Referring to the drawings, FIG. 1 shows a first arrangement of apparatus for producing a fly's eye lens by means of holography. The arrangement includes a monochromatic light source 10 which, advantageously, is a laser, and a shutter 9. Altrenatively, other types of light sources, with suitable filters, can be employed in placed of a laser. Whatever the nature of source 10, the light therefrom is directed onto a beam-splitter 11 by means of an appropriate lens system as represented by a lens 12.

Beam-splitter 11, which can be a partially transparent mirror, divides the incident light into two beams A and B. The first of these beams A is directed into a second beam-splitter 13, by means of a mirror 14, wherein beam A is divided and focused into a plurality of point sources which lie in a common plane $x$—$y$ whose surface is perpendicular to the direction of light propagation.

A variety of apparatus for dividing beam A in this manner can be used including, for example, a plurality of Wollaston prisms as described in the copending application by W. J. Tabor, Ser. No. 437,770, filed Mar. 8, 1965, and assigned to applicants' assignee. Alternative means include the use of optical fibers, each of which terminates in an aperture in a planar mask, as shown in FIG. 2. In this latter arrangement, the light from beam A is directed onto one end of a bundle 20 of optical fibers. The other ends of the fibers terminate at apertures in the planar surface of mask 21. The array thus formed can assume any configuration simply by changing the arrangement of apertures in which the fibers terminate.

The output light from the point sources produced by beam-splitter 13 is directed onto a photographic emulsion 17. In addition, the light in beam B, which is referred to in holography as the "reference" beam, is also directed upon the photographic emulsion 17 by means of a mirror 15 and, where required, a lens system represented by a lens 16. In accordance with a feature of the present invention, the directions of incidence of the reference beam and the output from the beam-splitter 13 are sufficiently different so that the plane x–y of point sources lies outside of the reference beam.

By actuating shutter 9, the emulsion is simultaneously exposed to the multiple output from beam-splitter 13 and reference beam B. Following exposure, the photographic emulsion 17 is developed in accordance with practices well known in the photographic art.

The negative thus produced is a lens, having all the properties normally associated with a lens when illuminated by monochromatic light. For example, a parallel beam of monochromatic light, incident on the negative, will be brought to a focus at a multiplicity of points in a plane at some distance from the negative. These points may be regarded as the focal points of the fly's eye lens for that particular wavelength light. Similarly, the negative will form a multiplicity of real images of an object illuminated with monochromatic light. Thus, the negative is a lens, but more particularly, it is a fly's eye lens.

Having produced a fly's eye lens in the manner described, an array of spots corresponding to the point sources used to form the hologram can be reconstructed simply by shining light through the hologram in the reverse direction. As described by Leith and Upatnieks, in the portion of their article cited above, "the captured waves are, in effect, released from the hologram record, whereupon they proceed onward, oblivious to the time lapse in their history."

In the particular illustration given by Leith and Upatnieks, a virtual image is produced by means of a reconstruction beam which impinges upon their hologram in the same direction as the reference beam that was used to produce the hologram. A real image can also be reproduced, however, by means of a reconstruction beam that is incident upon the fly's eye lens in a direction opposite to that of the reference beam. Means for doing this are illustrated in FIG. 3 which shows the fly's eye lens 30 exposed to a beam of light C derived from a monochromatic light source 31, preferably a laser source. An array of spots 32, are shown reproduced in the focal plane of the lens. It will be noted that the angle of incidence $\alpha$ made by the reconstruction beam C, is the same as the angle of incidence made by the reference beam B in FIG. 1.

If more than a simple array of spots is to be produced at a work piece, this additional information is imparted to the reconstruction beam, and appears as a multiplicity of real images at the work piece 33. As examples, the object information can be imparted to the reconstruction beam by means of a transparency 34, or in the form of a mask 35, having a particularly shaped aperture 36.

As noted previously, the focal plane x–y is made to lie outside of the reference beam. This was done so that upon reconstruction, the array of real images produced at the work piece likewise falls outside of that portion of the reconstruction beam that is not refracted as it passes through the hologram. Obviously, such unrefracted light would be an undesirable component, reducing the contrast and adding noises in the image plane.

While the reconstructing light is also monochromatic, it need not have the same wavelength as the light used to form the hologram. The use of light of a different wavelength merely shifts the location of the focal plane of the fly's eye lens.

The degree of monochromaticity required for the above-described process depends upon the resolution required. Thus, a light source from a low pressure mercury discharge, suitably filtered, can also be used in certain cases.

FIG. 4 illustrates apparatus for forming a hologram of an array of point sources on a point-by-point basis. As in FIG. 1, light from a monochromatic source 50 is divided into two beams A and B by means of a beam-splitter 51. Beam B, which is the reference beam, is directed upon the photographic emulsion 52 as a collimated beam by means of mirror 53, and the lens system 54. Beam A is also directed upon the photographic emulsion as a diverging beam by means of mirror 55 and a lens 56.

As before, shutter 49 is actuated so as to expose emulsion 52 simultaneously to the reference beam B and the diverging light source formed at the focal point of lens 56.

Following this exposure, the relative positions of the light source (hole in enclosure 57 at the focal point of lens 56) and the photographic emulsion are changed, and additional exposures made. This can be done either by moving the photographic emulsion 52, or by moving the mirror-lens assembly. For purposes of illustration, the mirror 55 and lens 56 are shown mounted in an enclosure 57 which is suitably supported and capable of moving in two mutually perpendicular directions, to form the desired array pattern. The number of spots that can be placed in an array by this method is limited due to the multiple exposures of the emulsion. Obviously, a point is reached when further exposures would over-expose the emulsion. Thus, this latter method of forming a hologram is best used for smaller arrays where a beam-splitter is not conveniently available.

It will be recognized, that the particular arrangements described are illustrative of only a small number of the many possible specific embodiments which can represent applications of the principles of the invention. Numerous and varied other arrangements can rearily be devised in accordance with these principles by those skilled in the art without departing from the spirit and scope of the invention.

What is claimed is:
1. Apparatus for producing a fly's eye lens by means of holography comprising:
   a substantialy monochromatic light source;
   a beam-splitter for dividing light emitted by said source into two beams;
   means for forming one of said beams into a plurality of point sources lying in a common plane;
   a photographic emulsion positioned to intercept the light emitted by said plurality of sources;
   means for directing the other of said two beams onto said emulsion;
   and means for simultaneously exposing said photographic emulsion to said plurality of sources and said other beam.

2. The apparatus according to claim 1 wherein said means for forming said one beam into a plurality of point sources comprises means for successively dividing said beam into $2^n$ sources, where $n$ is an integer.

3. The apparatus according to claim 1 wherein said means for forming said one beam into a plurality of diverging light sources comprises a bundle of optical fibers.

4. Apparatus for producing a fly's eye lens by means of holography comprising:
   a substantially monochromatic light source;
   a beam-splitter for dividing light emitted by said source into two beams;
   means for forming one of said beams into a point source of light;
   a photographic emulsion positioned to intercept the light emitted by said source;
   means for varying the relative positions of said emulsion and said source;
   means for directing the other of said two beams onto said emulsion;
   and means for simultaneously exposing said photographic emulsion to said other beam and said source.

References Cited

UNITED STATES PATENTS 3,107,170    10/1963    Netke _____ 88–24

JOHN M. HORAN, *Primary Examiner.*